(12) United States Patent
Ishii et al.

(10) Patent No.: US 7,937,111 B2
(45) Date of Patent: May 3, 2011

(54) WIRELESS BASE STATION APPARATUS AND WIRELESS COMMUNICATION CONTROL METHOD

(75) Inventors: Hiroyuki Ishii, Yokosuka (JP);
Masafumi Usuda, Yokosuka (JP);
Yoshimasa Imamura, Yokohama (JP);
Akihito Hanaki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 832 days.

(21) Appl. No.: 11/873,148

(22) Filed: Oct. 16, 2007

(65) Prior Publication Data
US 2008/0039145 A1 Feb. 14, 2008

Related U.S. Application Data

(63) Continuation of application No. 11/115,319, filed on Apr. 27, 2005, now Pat. No. 7,444,169.

(30) Foreign Application Priority Data

Apr. 30, 2004 (JP) .................................. 2004-136662

(51) Int. Cl.
*H04M 1/00* (2006.01)
*H04B 1/38* (2006.01)

(52) U.S. Cl. ...... 455/561; 455/62; 455/63.1; 455/67.13; 455/450; 455/464; 455/501; 455/504; 455/505; 455/562.1; 370/317; 370/322; 370/329; 370/341

(58) Field of Classification Search .................... 455/62, 455/63.1, 67.13, 450, 501, 504, 505, 561, 455/562.1; 370/317, 322, 329, 341
See application file for complete search history.

(56) References Cited

U.S. PATENT DOCUMENTS

| | | | |
|---|---|---|---|
| 5,828,695 | A | 10/1998 | Webb |
| 6,934,556 | B2 | 8/2005 | Takano |
| 6,983,166 | B2 | 1/2006 | Shiu et al. |
| 6,993,294 | B2 | 1/2006 | Nobukiyo et al. |
| 2003/0039218 | A1 | 2/2003 | Kwak |
| 2003/0043778 | A1 | 3/2003 | Luschi et al. |
| 2003/0045307 | A1 | 3/2003 | Arviv et al. |
| 2004/0022177 | A1 | 2/2004 | Awad et al. |

(Continued)

FOREIGN PATENT DOCUMENTS

CN 1277764 A 12/2000

(Continued)

OTHER PUBLICATIONS

3rd Generation Partnership Project, "Technical Specification Group Radio Access Network", Physical layer procedures (FDD), Release 5, 3GPP TS 25.214 v5.8.0, Mar. 2004, pp. 1-64.

(Continued)

*Primary Examiner* — Stephen M D'Agosta
(74) *Attorney, Agent, or Firm* — Oblon, Spivak, McClelland, Maier & Neustadt, L.L.P.

(57) ABSTRACT

A wireless base station apparatus (100) used in a wireless communications system includes a statistical processing unit (140) that performs statistical processing on downlink radio quality information reported from a wireless communications terminal device; a radio quality information offsetting unit (160) that adjusts the statistically processed downlink radio quality information based on a downlink transmission confirmation (ACK/NACK/DTX) message transmitted from the wireless communications terminal device and a required downlink quality; a transport format determination unit (170) that determines a downlink transport format based on the statistically processed radio quality information or the offset-adjusted radio quality information; and a transmitting unit (111) that transmits a downlink channel with the determined downlink transport format.

14 Claims, 6 Drawing Sheets

U.S. PATENT DOCUMENTS

| | | |
|---|---|---|
| 2004/0142698 A1 | 7/2004 | Pietraski |
| 2004/0179493 A1 | 9/2004 | Khan |
| 2004/0223507 A1 | 11/2004 | Kuchibhotla et al. |
| 2006/0133402 A1 | 6/2006 | Dottling et al. |

FOREIGN PATENT DOCUMENTS

| | | |
|---|---|---|
| EP | 1 513 282 A2 | 3/2005 |
| JP | 2002-152228 | 5/2002 |
| JP | 2003-188855 | 7/2003 |
| JP | 2003-244063 | 8/2003 |
| JP | 2005-86304 | 3/2005 |
| WO | WO 99/12304 | 3/1999 |
| WO | WO 03/067916 A1 | 8/2003 |
| WO | WO 03/094565 A1 | 11/2003 |

OTHER PUBLICATIONS

3$^{rd}$ Generation Partnership Project, "Technical Specification Group Radio Access Network", Physical layer aspects of Utra High Speed Downlink Packet Access, Release 4, 3GPP TR 25.848, v4.0.0, Mar. 2001, pp. 1-89.

3$^{rd}$ Generation Partnership Project 2 "3GPP2", cdma2000 High Rate Packet Data Air Interface Specification, 3GPP2 C.S0024-A Version 1.0, Mar. 2004, pp. 1-1 through 16-2.

ved and reported the downlink radio condition to the base station in uplink. The downlink radio condition includes, for example, the signal to interference ratio (SIR), the carrier to interference ratio (CIR), and receive power.

WIRELESS BASE STATION APPARATUS AND WIRELESS COMMUNICATION CONTROL METHOD

CROSS REFERENCE TO RELATED APPLICATIONS

This application is a continuation of U.S. application Ser. No. 11/115,319, filed on Apr. 27, 2005, all of which claim priority to Japanese Patent Application Serial No. 2004-136662, filed on Apr. 30, 2004. The contents of this document are incorporated herein by reference.

FIELD OF THE INVENTION

The present invention generally relates to wireless base station equipment and a wireless communication control technique, and more particularly, to adaptive modulation and coding (AMC) for controlling a transport format based on the downlink radio quality in a mobile communications system.

BACKGROUND OF THE INVENTION

When a wireless base station communicates with a mobile station (or a mobile terminal) in downlink of a mobile communications system, the transport format, such as the modulation scheme or the coding rate, may be adjusted in an adaptive manner according to the radio conditions of the downlink channel. This type of control is called adaptive modulation and coding (AMC).

In AMC, a mobile station monitors the radio condition of the downlink, and reports the downlink radio condition to the base station in uplink. The downlink radio condition includes, for example, the signal to interference ratio (SIR), the carrier to interference ratio (CIR), and receive power.

The wireless base station determines the transport format, such as the modulation scheme and the coding rate, for downlink communication, based on the downlink radio condition reported from the mobile station and the available radio resources in downlink in order to perform signal transmission according to the downlink radio condition. If the radio condition is good because the mobile station is located near the wireless base station or because the traveling speed of the mobile station is slow, a transport format that allows higher rate data transmission is selected. In contrast, under unsatisfactory radio conditions, a transport format suitable to lower rate transmission is selected. In this manner, wireless communications can be performed according to change in the radio environment.

The AMC technique is employed in so-called high speed downlink packet access (HSDPA) in the third generation mobile communications systems based on the IMT-2000 standard.

HSDPA is a new communication scheme supported by the 3GPP Release 5 standard, and the data rate is improved by a factor of 5 or more, as compared with the conventional W-CDMA. See 3GPP TS25.214 v5.8.0 and 3GPP TR25.848 v4.0.0. From the same point of view, the 3GPP2 supports the 1x-EVDO (1x-Evolution Data Only) standard dedicated for downlink high-rate data transmission. See 3GPP2 C.S0024-A v1.0.

The adaptive modulation and coding technique employed in HSDPA controls the modulation scheme or the coding rate of the radio channel according to the radio condition between the base station and the mobile station. The control information (radio quality information) transmitted from the mobile station to report the downlink radio condition is called a channel quality indicator (CQI), and this control information is mapped to a dedicated uplink control channel HS-DPCCH adapted for HSDPA.

In general, a mobile station estimates the channel quality indicator (CQI) based on the signal to interference ratio determined from the symbols of the downlink common pilot channel (CPICH). The CQI is estimated such that the transport block error rate (BLER) becomes 10% when receiving the transport format determined from that CQI.

FIG. 1 is a schematic block diagram of the MAC-hs processing unit of a conventional wireless base station. "MAC-hs" is the abbreviation for Media Access Control-HSDPA. In the MAC-hs processing unit 1112, a CQI is decoded at the layer-1 processing unit 1111. The decoded CQI is supplied to the CQI acquiring unit 1110, and then to the TFR (transport format and resource) selection unit 1170. The MAC-hs resource calculation unit 1120 includes an HS-DSCH power resource calculation unit 1121 and an HS-DSCH code resource calculation unit 1122 to calculate radio resources (such as power resources, code resources, or hardware resources) being allocated to the high-speed downlink shared channel (HS-DSCH).

The TFR selection unit 1170 determines the downlink transport format, including the modulation scheme, the number of codes, the transport block size (TBS) and the power offset, based on the channel quality indicator (CQI) received from the CQI acquiring unit 1110 and the radio resources (the power resources and the code resource) calculated by the MAC-hs resource calculation unit 1120 for allocation to the HS-DSCH. The downlink transport format and transmit power level determined by the TFR selection unit 1170 are supplied to the layer-1 processing unit 1111. The layer-1 processing unit 1111 performs downlink signal transmission using the transport format determined by the TFR selection unit.

In HSDPA, hybrid automatic repeat request (H-ARQ) control is also performed between the base station and the mobile station. The mobile station receives a downlink, maps the decoding result (OK or NG) of the received data to the HS-DPCCH, and transmits it in uplink as a confirmation message of the downlink transmission. The confirmation message includes ACK, NACK, and DTX. The ACK message represents the safe receipt of the data, the NACK message represents negative acknowledge, and the DTX message represents that the downlink itself has not been received because the mobile station cannot receive the downlink shared control channel HS-SCCH for some reason. Based on the confirmation message from the mobile station, the base station retransmits the data in the H-ARQ control.

In adaptive modulation and coding for determining the downlink transport format at the base station according to the downlink radio quality reported from the mobile station, it takes at least 5 ms to 7 ms from the measurement of the downlink radio condition at the mobile station up to the actual signal transmission from the base station based on the measurement result. Accordingly, if the propagation environment varies frequently, the adaptive modulation and coding cannot follow the change in the radio environment. If the traveling speed of the mobile station is fast, and if the adaptive modulation and coding is behind the change in the transmission channel, then the throughput of the downlink is degraded.

Another problem is the accuracy of the CQI estimation. The mobile station calculates the CQI such that the downlink block error rate will become 10%. However, if the propagation environment changes too quickly, the CQI cannot be calculated accurately, and may not bring the downlink block error rate to or near 10%. Then the base station cannot determine the transport format appropriately because of the inaccurate CQI.

In addition, since the mobile station calculates the CQI based on the required block error rate, it is difficult for the base station to control the block error rate. If there are multiple mobile stations under the base station, the actual block error rate varies among the mobile stations due to differences or variations in performance.

SUMMARY OF THE INVENTION

The present invention was conceived in view of the above-described problems, and it is an object of the present invention to provide a wireless base station apparatus and a wireless communication control method that can maintain the downlink throughput high even if adaptive modulation and coding is employed in a frequently-changing radio environment.

In one aspect of the invention, a wireless base station apparatus used in a wireless communications system to communicate with a wireless communications terminal device is provided. The wireless base station apparatus comprises:
(a) a statistical processing unit configured to perform statistical processing on downlink radio quality information reported from the wireless communications terminal device;
(b) a transport format determination unit configured to determine a downlink transport format based on the statistically processed radio quality information; and
(c) a transmitting unit configured to transmit a downlink channel with the determined downlink transport format.

With this arrangement, the radio quality information, such as channel quality indicator, reported from the wireless communications terminal device is statistically processed, and the appropriate transport format is selected based on the statistical processing result. Consequently, the downlink throughput can be maintained high even if it is difficult for adaptive modulation and coding to follow the change in the propagation environment.

In another aspect of the invention, the wireless base station apparatus comprises:
(a) a radio quality information offsetting unit configured to adjust downlink radio quality information reported from the wireless communications terminal device, based on a downlink transmission confirmation message transmitted from the wireless communication terminal and a required downlink quality;
(b) a transport format determination unit configured to determine a downlink transport format based on the offset-adjusted radio quality information; and
(c) a transmitting unit configured to transmit a downlink channel with the determined downlink transport format.

With this arrangement, the radio quality information reported from the wireless communications terminal device is adjusted (or offset-processed) so as to achieve a prescribed block error rate. Consequently, wireless communication can be performed at a prescribed block error rate even if it is difficult for the wireless communication terminal device to calculate an accurate radio quality due to a frequently changing radio environment.

In addition, wireless communication can be performed at a stable block error rate determined by the wireless base station even if the block error rate varies among mobile terminals (wireless communications terminal devices) due to differences in performance.

In still another aspect of the invention, a wireless communication control method is provided. The method comprises the steps of:
(a) averaging downlink radio quality information reported from a wireless communication terminal device;
(b) determining a downlink transport format based on the averaged radio quality information; and
(c) transmitting a downlink channel in the determined downlink transport format.

BRIEF DESCRIPTION OF THE DRAWINGS

Other objects, features, and advantages of the invention will become more apparent from the following detailed description when read in conjunction with the accompanying drawings, in which.

DETAILED DESCRIPTION OF THE PREFERRED EMBODIMENT

The present invention is described in detail below in conjunction with the attached drawings.

Figure 1:
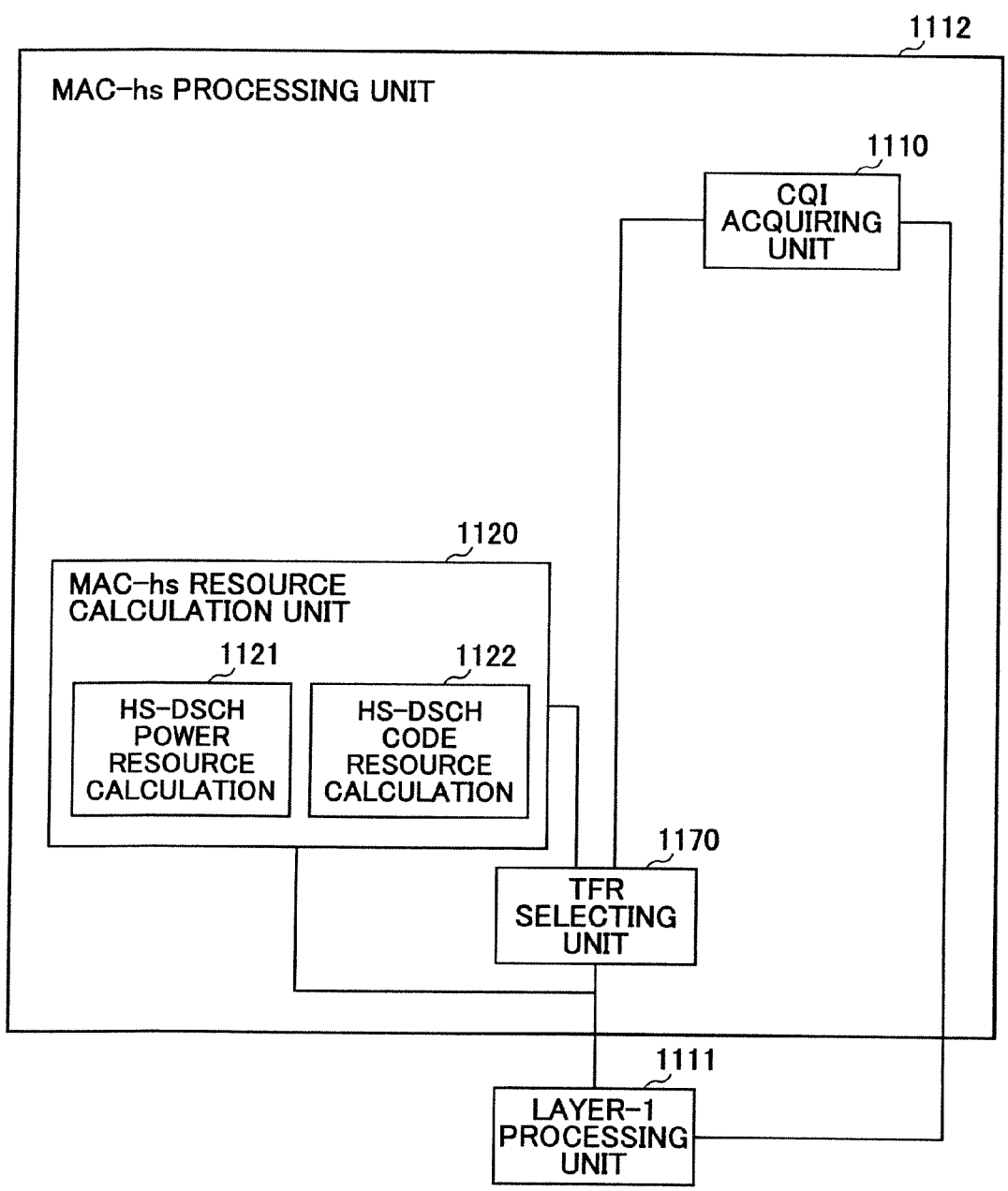
FIG. 1 is a schematic block diagram of a MAC-hs processing unit used in a conventional wireless base station.
Figure 2:
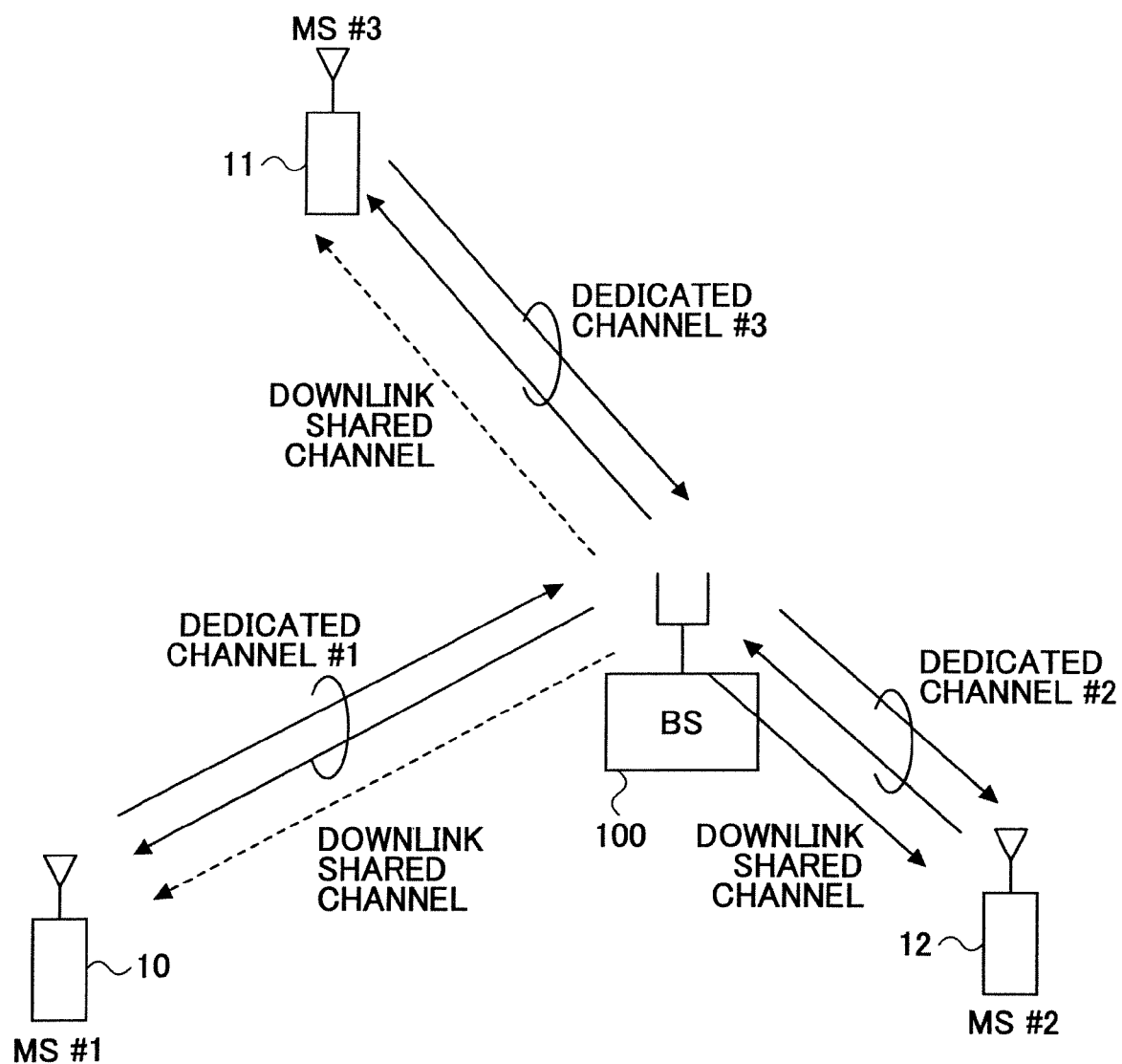
FIG. 2 is a schematic diagram illustrating a mobile communications system to which the wireless communication control method of the present invention is applied.

FIG. 2 is a schematic diagram illustrating a mobile communications system to which the wireless communication control method according to an embodiment of the invention is applied.

The mobile communications system includes a wireless base station 100 and multiple mobile stations (#1-#3) 10, 11, and 12, and employs high speed downlink packet access (HSDPA). In downlink packet transmission in HSDPA, a downlink shared channel (DSCH) or a high speed downlink shared channel (HS-DSCH) is shared by the mobile stations 10-12. Dedicated channels (uplink/downlink bi-directional channels) #1-#3 associated with physical channels are also allocated individually to the mobile stations 10-12.

On uplink of the dedicated channels #1-#3, control information is transmitted, other than user data. Control information includes pilot symbols, power control command (TPC command) required for transmission of downlink of the dedicated channel, downlink quality information used for scheduling of the shared channel and AMC control, and a confirmation message of H-ARQ.

On downlink of the dedicated channels #1-#3, transmission power control commands for the corresponding uplink channel and other necessary information are transmitted.

In this embodiment, the mobile stations (#1-#3) 10-12 have the same structure and function. In HSDPA, a single physical channel is shard among multiple mobile stations. Averaging of channel quality indicator (CQI) and adjustment of CQI offset are performed for each of the mobile stations. In the following, explanation is made using an arbitrary mobile station N as an example.

Figure 3:
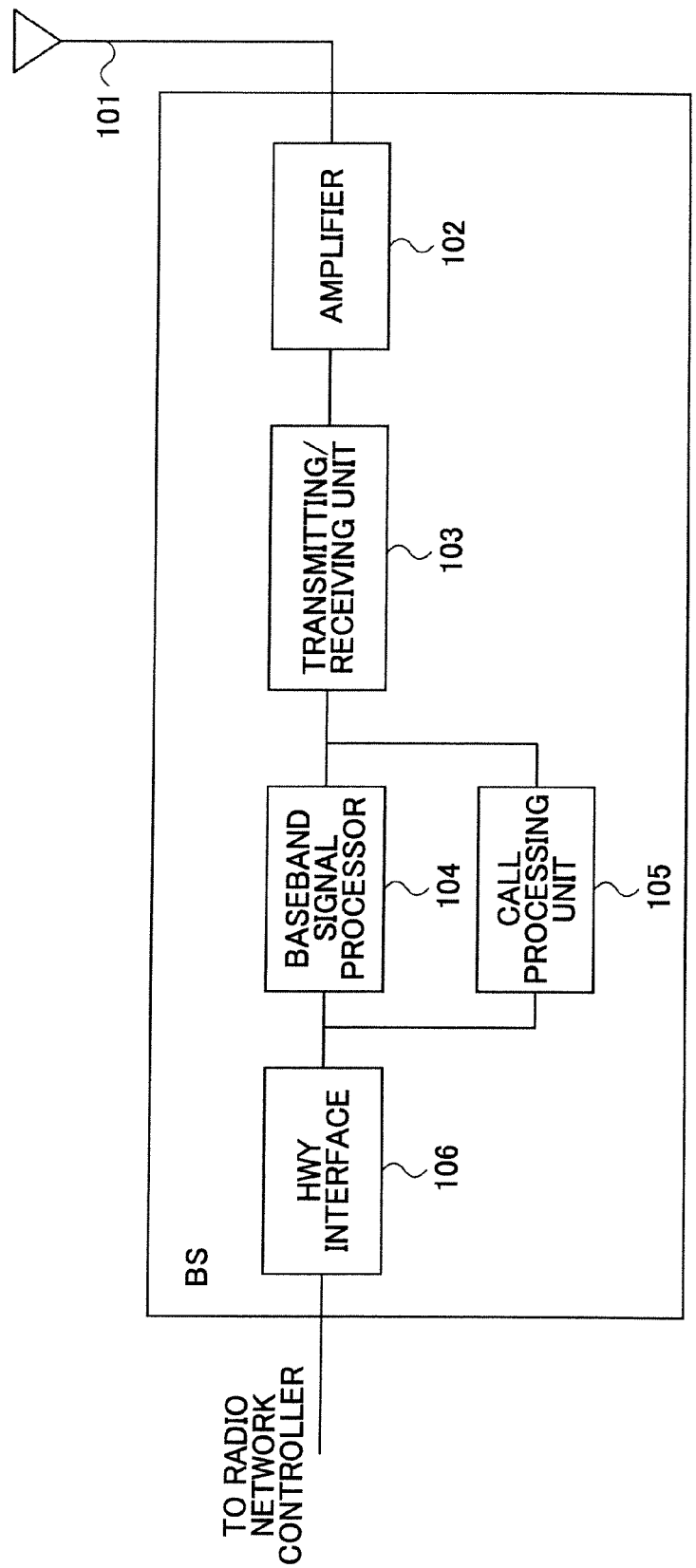
FIG. 3 is a block diagram of a wireless base station used in the mobile communications system shown in FIG. 2 according to an embodiment of the invention.

FIG. 3 is a block diagram of the wireless base station 100 shown in FIG. 2. The wireless base station 100 has a transmitting/receiving antenna 101, an amplifier 102, a transmitting and receiving unit 103, a baseband signal processing unit 104, a call processing unit 105, and an HWY interface 106.

A downlink packet data item is input to the baseband signal processing unit 104 via the HWY interface 106 from upper-layer radio control equipment. The baseband processing unit 104 performs H-ARQ control, scheduling, selection of transport format, channel encoding, and spreading. The downlink packet having been subjected to the baseband processing (baseband signal) is supplied to the transmitting and receiving unit 103. The transmitting and receiving unit 103 performs frequency conversion on the baseband-processed signal to produce an RF signal. The RF signal is amplified by the amplifier 102, and transmitted from the transmitting/receiving antenna 101.

On the other hand, an uplink data item is received as an RF signal at the transmitting/receiving antenna 101, amplified by the amplifier 102, and converted into a baseband signal through frequency conversion at the transmitting and receiving unit 104. The baseband signal is then subjected to despreading, RAKE combining, error correction and decoding at the baseband processing unit 104, and supplied to the upper-layer radio control equipment via the HWY interface 106.

The baseband signal contains a channel quality indicator (CQI) indicating the radio condition of the mobile station and a confirmation message (ACK/NACK/DTX) of H-ARQ, which are to be used in MAC-hs processing as is described below. These information items are decoded at the layer-1 processing unit of the baseband processing unit 104, and then used in the MAC-hs processing unit, as described below.

The call processing unit 105 transmits and receives a call proceeding control signal to and from the upper-layer radio control equipment. The call processing unit 105 also manages the state of the wireless base station 100, and allocates resources.

Figure 4:
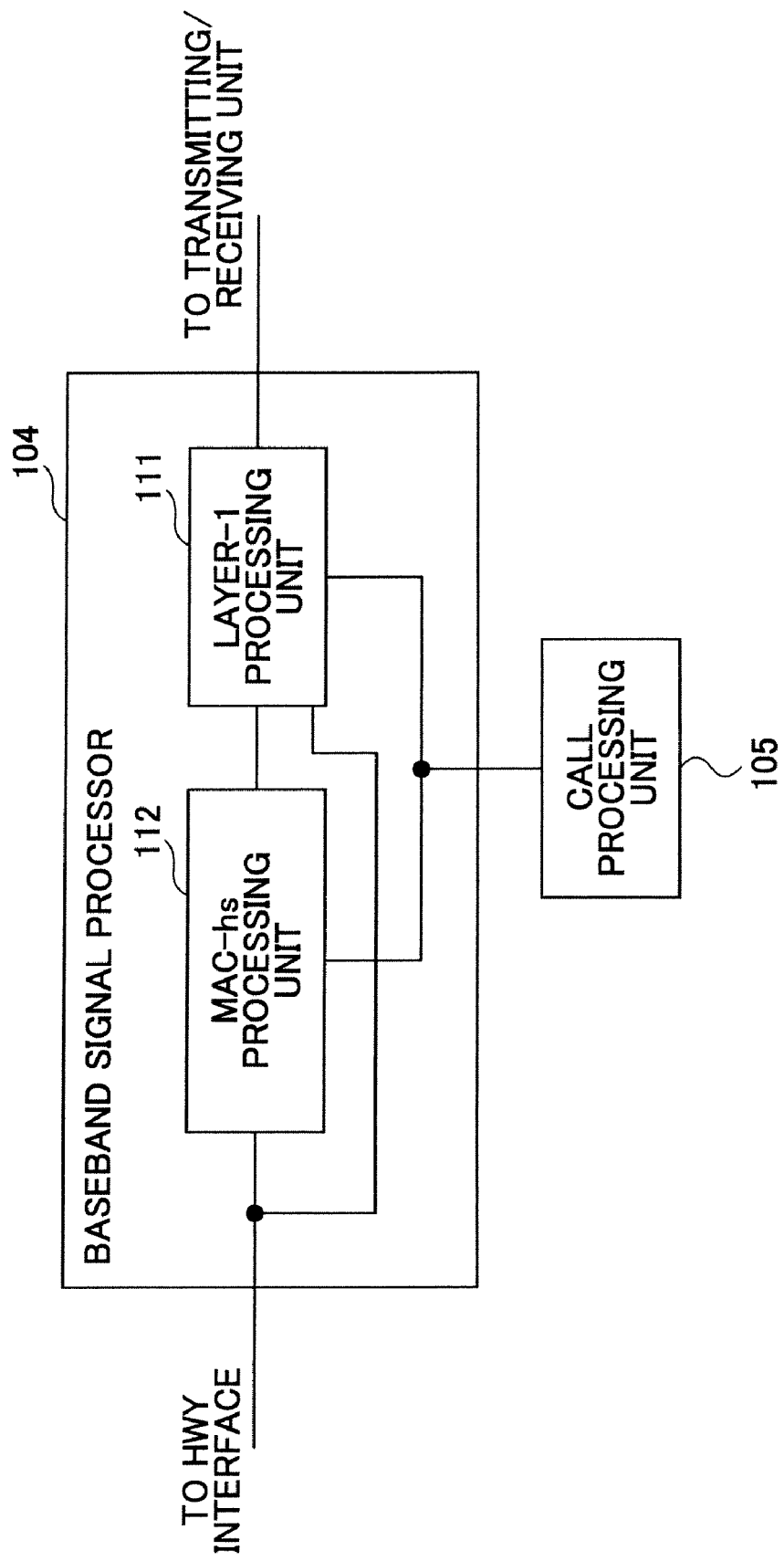
FIG. 4 is a block diagram of the baseband signal processing unit used in the wireless base station according to an embodiment.

FIG. 4 is a block diagram of the baseband signal processing unit 104. The baseband processing unit 104 includes a layer-1 processing unit 111 and a MAC-hs processing unit 112, which units are connected to the call processing unit 105. The layer-1 processing unit 111 performs encoding of downlink data channels, decoding of uplink data channels, transmit power control for uplink and downlink channels, RAKE combining, spreading and despreading. The layer-1 processing unit is configured to receive a CQI message for indicating the downlink radio condition and a confirmation massage (ACK/NACK/DTX) of H-ARQ, which items are contained in the dedicated control-bit field of the packet transmitted in the dedicated uplink physical channel from the mobile station, and supplies these items to the MAC-hs processing unit 112.

The MAC-hs processing unit 112 performs H-ARQ control for the downlink shared channel in HSDPA, scheduling of the queueing packets, and selection of transport format and resources.

Figure 5:
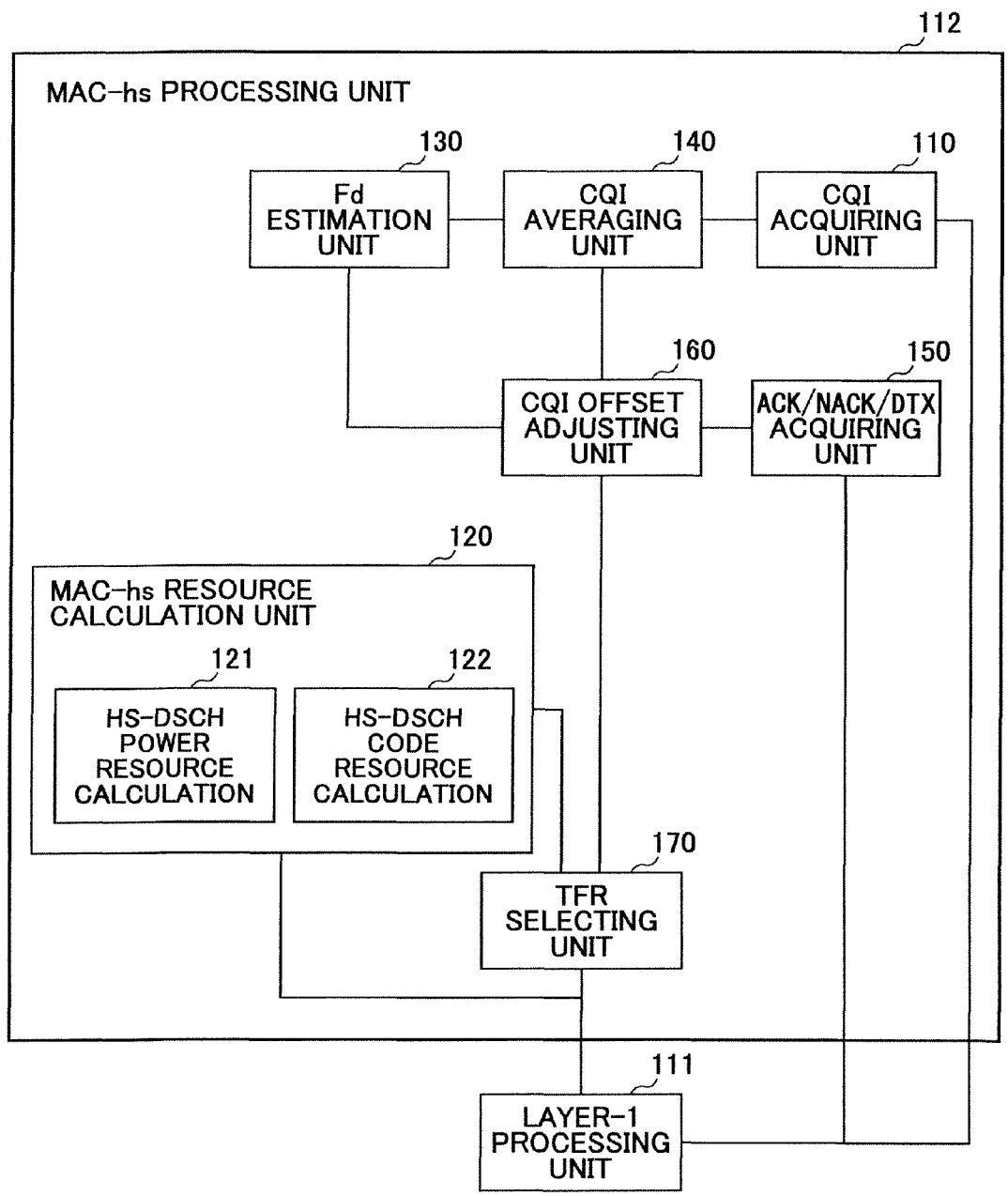
FIG. 5 is a block diagram of the MAC-hs processing unit used in the wireless base station according to an embodiment of the invention.

FIG. 5 is a block diagram of the MAC-hs (MAC-HSDPA) processing unit 112. The MAC-hs processing unit 112 includes:
(1) CQI acquiring unit 110;
(2) MAC-hs resource calculation unit 120;
(3) fading (Fd) estimation unit 130;
(4) CQI averaging unit 140;
(5) ACK/NAC/DTX acquiring unit 150;
(6) CQI offset adjusting unit 160; and
(7) TFR (transport format and resources) selecting unit 170.

The MAC-hs processing unit 112 also performs flow control, packet scheduling control, and H-ARQ control; however, explanations for these functions are omitted here because these are not directly associated with the present invention.

In the MAC-hs processing unit 112, the CQI acquiring unit 110 acquires a channel quality indicator decoded by the layer-1 processing unit 111, and supplies the decoded CQI to the CQI averaging unit 140.

The MAC-hs resource calculation unit 120 includes an HS-DSCH power resource calculation unit 121 and an HS-DSCH code resource calculation unit 122 to calculate the radio resources (including power resources, code resources, and hardware resources) to be allocated to the high-speed downlink shared channel (HS-DSCH).

The fading (Fd) estimation unit 130 estimates the fluctuation in the propagation environment between the wireless base station 100 and the mobile station, that is, the fading frequency, and supplies the estimation result to the CQI averaging unit 140 and the CQI offset adjusting unit 160. The fading frequency can be estimated using, for example, time correlation of the fading multipath channels of the uplink pilot signal, or time correlation of the channel estimates determined from the pilot signal.

The fading frequency may also be estimated based on the velocity of the mobile station. In this case, the mobile station determines the traveling velocity (the Doppler frequency) based on the GPS location information or the vehicle information (such as the speedometer) on which the mobile station is mounted. The velocity of the mobile station is reported to the wireless base station on uplink, and the fading (Fd) estimation unit 130 estimates the fading frequency based on the reported velocity of the mobile station.

The CQI averaging unit 140 receives the CQI information supplied from the CQI acquiring unit 110 and the fading frequency estimated by the Fd estimation unit 130, and performs statistical processing on the CQI information (that is, averages the CQI values) using the fading frequency. The averaged CQI is output to the CQI offset adjusting unit 160.

In averaging the CQI, the CQI averaging unit 140 compares the fading frequency with a prescribed threshold (for example, 30 Hz). If the fading frequency is below the threshold value (30 Hz), it is determined that the adaptive modulation and coding can follow the change in the propagation environment, and the averaging of the CQI is not performed. If the fading frequency is at above 30 Hz, in this example, it is determined that the AMC cannot catch up with the change in the propagation environment, and the CQI averaging is performed.

The averaging criteria may be set at three stages, that is, below 30 Hz, from 30 Hz to 70 Hz, and above 70 Hz. In this case, the CQI averaging is not performed with the fading frequency below 30 Hz, the CQI averaging is performed for a short period of time (e.g., for 0.5 seconds) in the range from 30 Hz to 70 Hz, and the CQI averaging is performed for a longer period of time (e.g., for 1 second) above 70 Hz.

Alternatively, the CQI averaging may be performed for a longer period of time (e.g., for 2 seconds) when the fading frequency is in the range from 30 Hz to 70 Hz, and performed for a short period of time (e.g., for 0.5 seconds) when the fading frequency is at or above 70 Hz.

The CQI averaging time may be controlled according to the estimated fading frequency. For example, when the estimated fading frequency is small, the CQI averaging time may be set short, while at a higher fading frequency the CQI averaging time may be set longer. Alternatively, the CQI averaging time may be set longer at a lower fading frequency, and set shorter at a higher fading frequency.

The CQI averaging is not necessarily the above-described simple time averaging, but another type of averaging, for example, averaging using a forgetting factor α expressed by Equation (1) or ordinary averaging expressed by Equation (2) may be used.

$$CQI_{averaging}(n) = \alpha \cdot CQI_{averaging}(n-1) + (1-\alpha) \cdot CQI_{received}(n) \quad (1)$$

$$CQI_{averaging}(n) = \frac{\sum_{i=n-N+1}^{n} CQI_{received}(i)}{N} \quad (2)$$

where $CQI_{averaging}(n)$ denotes the averaged CQI at sub-frame n, and $CQI_{received}(n)$ denotes non-averaged CQI (raw data of CQI received in uplink from the mobile station).

The symbols α and N denote the parameters for controlling the degree of averaging in Equations (1) and (2), respectively. The system may be designed such that the averaging is not performed when α is set to zero (α=0) or N is set to one (N=1).

The CQI is expressed in dB in association with the downlink SIR. The CQI is converted into a channel quality level with a true value using Equation (3) before the averaging, and the CQI averaging is performed based on the converted values. Then, the averaged CQI with a value equivalent to the true value is returned to the dB value.

$$CQI\_true = 10^{\frac{CQI\_dB}{10}} \quad (3)$$

where CQI_true denotes the CQI equivalent to the true level, and CQI_dB denotes the CQI in dB. The conversion between the true level and the dB value may be omitted, and the CQI averaging may be performed in dB.

The ACK/NACK/DTX acquiring unit 150 receives the decoding result of the ACK/NACK/DTX message of H-ARQ control from the layer-1 processing unit 111, and supplies it to the CQI offset adjusting unit 160.

The CQI offset adjusting unit 160 receives the decoded ACK/NACK/DTX from the ACK/NACK/DTX acquiring unit 150, while receiving the averaged CQI ($CQI_{averaging}$) from the CQI averaging unit 140. If the CQI averaging is not performed, the CQI offset adjusting unit 160 receives the raw CQI information received in uplink. Then, the CQI offset adjusting unit 160 performs offset adjustment to the averaged CQI such that the block error rate (BLER) becomes a prescribed level, based on the decoding result of the ACK/NACK/DTX message.

In the offset adjustment, an offset value (CQI-offset) is calculated based on Equation (4), and then CQI offset adjustment is performed based on Equation (5).

$$CQI\_offset = \begin{cases} CQI\_offset + \Delta_{adj} \times BLER_{target} & \text{Input} = \text{"Ack"} \\ CQI\_offset - \Delta_{adj} \times (1 - BLER_{target}) & \text{Input} = \text{"Nack"} \\ CQI\_offset & \text{Input} = \text{"DTX"} \end{cases} \quad (4)$$

$$CQI\_adjusted = \lfloor CQI_{averaging} + CQI\_offset \rfloor \quad (5)$$

where Δadj denotes the step size of the offset adjustment, and $BLER_{target}$ denotes the target block error rate. The system may be designed such that the CQI offset adjustment is not performed when Δadj is set to zero.

Concerning the ACK/NAC/DTX message transmitted from the mobile station, an ACK message represents that the appropriate decoding result of the downlink channel is obtained, a NACK message represents a negative result in decoding the downlink channel, and a DTX message represents that the downlink channel has not been decoded at the mobile station due to an error in receiving the downlink control channel HS-SCCH.

When the wireless base station receives the ACK message, it is determined that the CQI can be set larger than the CQI value reported from the mobile station, and the offset adjustment is performed on the averaged CQI using an offset value to which the product of the offset adjustment step size (Δadj) and the target block error rate ($BLER_{target}$) is added.

When the wireless base station receives the NACK message, it is determined that the CQI has to be set smaller than the CQI value reported from the mobile station, and offset adjustment is performed to the averaged CQI using an offset value from which (offset adjustment step size)* $(1-BLER_{target})$ is subtracted.

When the wireless base station receives the DTX message, it is determined that the high-speed downlink shared channel (HS-DSCH) has not been decoded due to error in receiving the downlink control channel HS-SCCH, and accordingly, the offset adjustment is not performed.

In this manner, the CQI value can be controlled such that the block error rate of the downlink HS-DSCH becomes the target block error rate $BLER_{target}$. In other words, the offset value is determined so as to bring the downlink channel quality to the target quality according to the target block error rate and the decoding result of the downlink channel, based on Equation (4). Then, the CQI value is adjusted by adding the offset value (CQI_offset) to the averaged CQI determined by the CQI averaging unit 140, thereby producing the adjusted CQI (CQI_adjusted).

In Equation (5), the symbol "⌊ ⌋" denotes the round down function, and accordingly, the offset-adjusted CQI (CQI_adjusted) is expressed as an integer. Although in this embodiment round down is employed, the offset-adjusted CQI may be rounded up or simply rounded off to the nearest integer.

The offset adjustment step size Δadj and the target block error rate $BLER_{target}$ may be selected appropriately according to the priority class, the service type, the cell, or the contract type.

For example, if the service type is data streaming that requires the error rate to be reduced, the adjustment step size Δadj is set greater in order to provide the prompt effect of the offset adjustment when the NACK message is received, or alternatively, the target block error rate $BLER_{target}$ is set smaller to decrease the downlink error rate.

In contrast, if the service type is FTP, a relatively large error rate is acceptable. In this case, the target block error rate $BLER_{target}$ is set higher to increase the downlink error rate. Although the downlink error rate rises, the downlink throughput can be increased because the downlink transport block size increases along with the increased CQI.

The CQI offset adjusting unit 160 may be configured to receive the estimation result of the fading frequency from the fading (Fd) estimation unit 130. In this case, ON/OFF switching of the CQI offset adjusting unit 160, the adjustment step size Δadj, and the target block error rate $BLER_{target}$ can be controlled based on the fading frequency estimated by the fading (Fd) estimation unit 130. For example, the CQI offset adjustment is turned off if the fading frequency is below 50 Hz, and turned on if the fading frequency is at or above 50 Hz. With this arrangement, adaptive modulation and coding can be performed at an appropriate downlink block error rate in both the slow fading environment with high precision of CQI calculation at the mobile station and the high-speed fading environment with degraded precision of CQI calculation at the mobile station.

The CQI control may be performed such that the CQI offset adjustment is turned off if the fading frequency is below 30 Hz, that the $BLER_{target}$ is set to 10% if the fading frequency is in the range from 30 Hz to 80 Hz, and that the $BLER_{target}$ is set to 30% if the fading frequency is above 80 Hz, for example. By adjusting the control parameters according to the fading frequency, the CQI offset adjustment can be implemented according to the fading environment.

The offset-adjusted CQI is supplied to the TFR selecting unit 170.

The TFR selecting unit 170 determines the transport format (coding modulation, the level of multilevel modulation, coding rate, etc.) and the transmit power of the downlink channel for the current users, based on the offset-adjusted CQI supplied from the CQI offset adjusting unit 160 and the radio resources (power resources, code resources, and hardware resources) calculated by the MAC-hs resource calculation unit 120 and to be allocated to the HS-DSCH. The downlink transport format and transmit power determined by the TFR selecting unit 170 is supplied to the layer-1 processing unit.

In this embodiment, the CQI averaging and the CQI offset adjustment are performed by the CQI averaging unit 140 and the CQI offset adjusting unit 160, respectively. However, the invention is not limited to this example. For example, only the CQI offset adjustment may be performed without performing CQI averaging, or alternatively, only CQI averaging may be performed without performing CQI offset adjustment.

The CQI averaging unit 140 and the CQI offset adjusting unit 160 can independently make use of the estimation result of the fading frequency. For example, the CQI averaging may be performed when the estimated fading frequency is at or above 50 Hz, and not be performed below 50 Hz, while the CQI offset adjustment may be always performed regardless of the estimated fading frequency. Alternatively, the CQI averaging is turned on at or above 40 Hz, and turned off below 40 Hz, while the CQI offset adjustment may be turned on at or above 100 Hz and turned off below 100 Hz.

Figure 6:
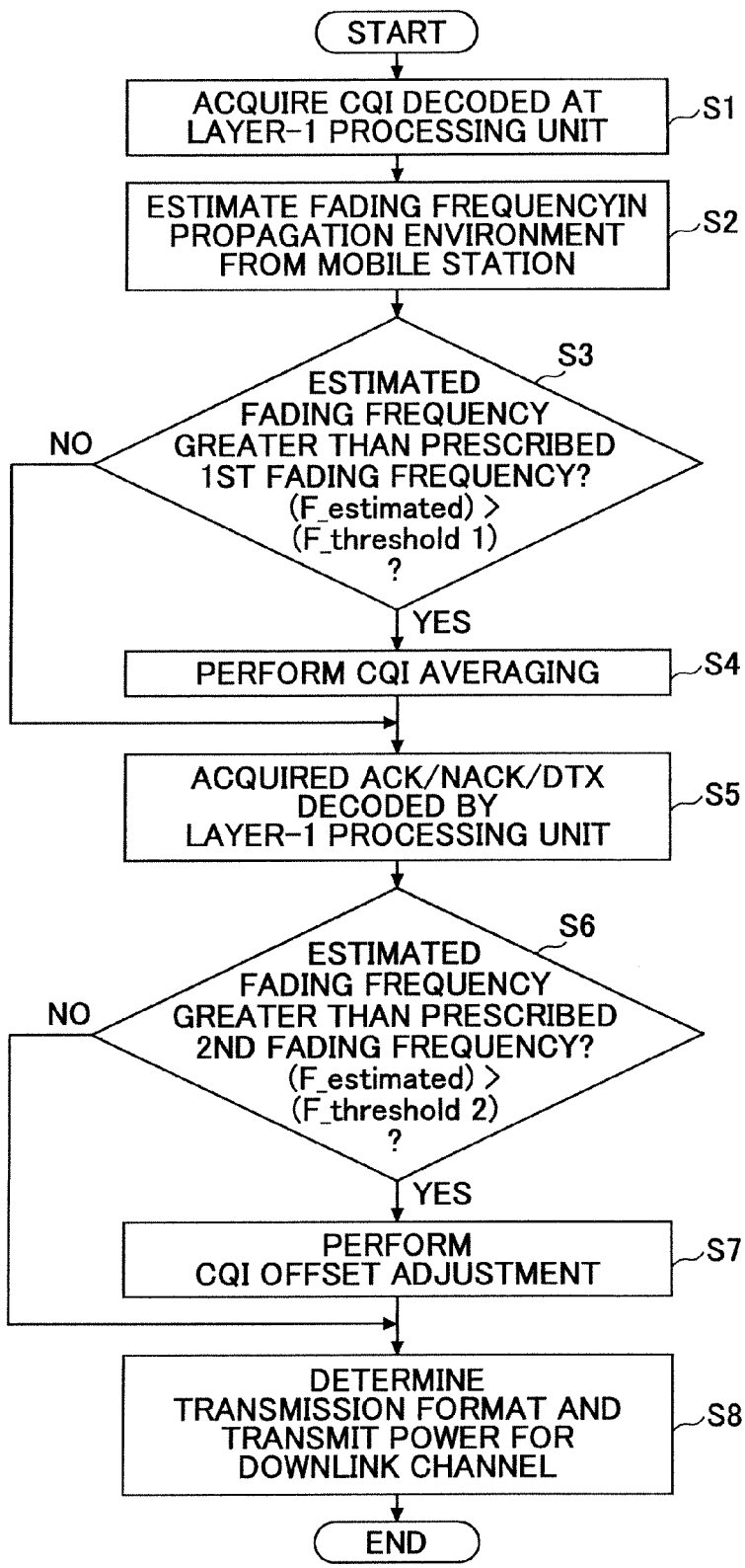
FIG. 6 is a flowchart of determination of the downlink transport format carried out at the MAC-hs processing unit.

Next, explanation is made of the transport format determination process for the downlink channel, with reference to FIG. 6.

FIG. 6 is a flowchart of the transport format determination process carried out by the MAC-hs processing unit 112. First, the CQI acquiring unit 110 of the MAC-hs processing unit 112 acquires the decoded CQI from the layer-1 processing unit 111 in step S1. Then, the fading (Fd) estimation unit 130 estimates the fading frequency between the wireless base station 100 and the mobile station in step S2.

Then, in step S3, the CQI averaging unit 140 compares the estimated fading frequency (F_estimated) supplied from the Fd estimation unit 130 with a prescribed fading frequency (F_threhod1). If the estimated fading frequency (F_estimated) is greater than the threshold frequency (F_threshold1) (YES in S3), the decoded CQI values supplied from the layer-1 processing unit 111 are averaged in step S4. If the estimated fading frequency is at or below the prescribed threshold level (NO in S3), CQI averaging is not performed.

Then, in step S5, the ACK/NACK/DTX acquiring unit 150 acquires the ACK/NAC/DTX message decoded by the layer-1 processing unit 111. Then, in step S6, the CQI offset adjusting unit 160 compares the estimated fading frequency (F_estimated) with a prescribed threshold (F_threshold 2). If the estimated fading frequency is greater than the threshold 2 (YES in S6), CQI offset adjustment is performed based on the decoded ACK/NACK/DTX message in step S7. If the estimated fading frequency is equal to or smaller than the prescribed threshold 2 (NO in S6), the process jumps to step S8 without performing the CQI offset adjustment on the averaged CQI.

In step S8, the TFR selecting unit 170 determines the transport format (the number of codes, the level of multilevel modulation, the coding rate, etc.) and the transmit power of the downlink channel, based on the offset-adjusted or non-adjusted CQI (determined at step 6 or 7) and the radio resources to be allocated to the HS-DSCH.

Although, in the example shown in FIG. 6, a single threshold is set for the comparison with the estimated fading frequency in each of steps S3 and S6, two or more threshold values may be set for the comparison to control the parameters α and N used in step S3 to adjust the averaging range, or the parameters Δadj and $BLER_{target}$ used in step S6, in a more detailed manner according to the estimated fading frequency.

With the wireless communication control method of the embodiment, the downlink throughput can be maintained even if the AMC cannot follow the change in the propagation environment between the base station and the mobile station due to frequent change (with a greater fading frequency), because the instantaneous CQI reported from the mobile station is averaged and the downlink transport format is determined based on the averaged CQI. This arrangement allows the downlink throughput to be improved, as compared with the conventional technique for determining the downlink transport format based on the instantaneous value of the CQI.

If the mobile station cannot accurately calculate the CQI due to fast change in the propagation environment between the base station and the mobile station (with a large fading frequency), the base station performs offset adjustment on the CQI reported from the mobile station so as to bring the block error rate to the target level. Accordingly, an appropriate downlink transport format can be determined based on the more accurate CQI.

The wireless base station sets an arbitrary level of the target block error rate to perform the offset adjustment on the CQI reported from the mobile station to control the downlink block error rate. In other words, even if the downlink block error rate varies due to differences in the CQI calculation method among multiple mobile stations, the downlink block error rate can be adjusted to the target block error rate determined by the wireless base station.

The CQI averaging unit 140 and the CQI offset adjusting unit 160 of the MAC-hs processing unit 112 may be configured as a CPU, a digital signal processor (DSP), or a programmable device (such as EPGA). In this case, it is preferable to store a program for executing the operations shown in the flowchart of FIG. 6 in a prescribed area in non-volatile memory, and to download and update the parameters (α, N, Δadj, and $BLER_{target}$). These parameters may be downloaded from the upper-layer radio control equipment. Alternatively, an external interface may be provided to the CQI averaging unit 140 and the CQI offset adjusting unit 160 to read the above-described parameters (α, N, Δadj, and $BLER_{target}$) directly from a portable terminal device, such as a notebook-type computer.

Each of the functional blocks of the MAC-hs processing unit 112 may be implemented as a corresponding block divided in hardware, or implemented by a software program on the processor.

Although the invention has been described as being applicable to the high-speed packet transmission scheme HSDPA of the 3GPP standard, the invention is not limited to this example, and is applicable to other high-speed packet transmission schemes, such as cdma2000 1xEV-DO of the 3GPP2 standard or TDD high-speed packet transmission, performing downlink packet-transmission control (scheduling) in a mobile communications system.

In the embodiment, the CQI acquiring unit 110 and the CQI averaging unit 140 correspond to the radio quality statistical processing means. The TFR selecting unit 170 corresponding to the downlink transport format determination means. The layer-1 processing unit 111 corresponds to the downlink transmission means. The CQI averaging unit 140 corresponds to the averaging time (or section) controlling means and radio quality averaging means. The ACK/NACK/DTX acquiring unit 150 and the CQI offset adjusting unit 160 correspond to radio quality information offset means. The CQI offset adjusting unit 160 corresponds to the offset parameter control means. The wireless base station 100 corresponds to wireless base station equipment (or apparatus), and the mobile station corresponding to a wireless communications terminal device.

This patent application is based on and claims the benefit of the earlier filing dates of Japanese Patent Application No. 2004-136662 filed Apr. 30, 2004, the entire contents of which are hereby incorporated by reference.

What is claimed is:

1. A wireless base station apparatus configured to perform wireless communication with a wireless communications terminal device, the apparatus comprising:
a radio quality information offsetting unit configured to adjust downlink radio quality information reported from the wireless communications terminal device, to produce offset-adjusted radio quality information, such that a block error rate becomes a target level, based on a downlink transmission confirmation message transmitted from the wireless communication terminal and a required downlink quality;
a transport format determination unit configured to determine a downlink transport format based on the offset-adjusted radio quality information; and
a transmitting unit configured to transmit on a downlink channel with the determined downlink transport format, wherein
the radio quality information offsetting unit is further configured to produce the offset-adjusted radio quality information, in which an offset value is increased when the downlink transmission confirmation message transmitted from the wireless communications terminal includes an ACK, produce the offset-adjusted radio quality information, in which the offset value is decreased when the downlink transmission confirmation message transmitted from the wireless communications terminal includes a NACK, and produce the offset-adjusted radio quality information, in which the offset value is unchanged when the downlink transmission confirmation message transmitted from the wireless communications terminal includes a DTX.

2. The wireless base station apparatus of claim 1, wherein the radio quality information offsetting unit is further configured to adjust the downlink radio quality information reported from the wireless communications terminal device based on an average of a plurality of radio quality information indicators reported from the wireless communication terminal device.

3. The wireless base station apparatus of claim 1, wherein the radio quality information offsetting unit is further configured to adjust the downlink radio quality information reported from the wireless communications terminal device based on which one of the ACK, the NACK, or the DTX is included in the downlink transmission confirmation message transmitted from the wireless communications terminal.

4. The wireless base station apparatus of claim 1, wherein the radio quality information offsetting unit is further configured to adjust the target level based on a priority class.

5. The wireless base station apparatus of claim 1, wherein the radio quality information offsetting unit is further configured to adjust the target level based on a service type.

6. The wireless base station apparatus of claim 1, wherein the radio quality information offsetting unit is further configured to adjust the target level based on a current communication cell.

7. The wireless base station apparatus of claim 1, wherein the radio quality information offsetting unit is further configured to adjust the target level based on a contract type.

8. A wireless base station apparatus configured to perform wireless communication with a wireless communication terminal device, the apparatus comprising:
a radio quality information offset unit configured to adjust downlink radio quality information reported from the wireless communication terminal device, to produce offset-adjusted radio quality information, such that a block error rate becomes a target level, based on a downlink transmission confirmation message transmitted from the wireless communications terminal and a required downlink quality;
a transport format determination unit configured to determine a downlink transport format based on the offset-adjusted radio quality information; and
a transmitting unit configured to transmit a downlink channel with the determined downlink transport format, wherein
the radio quality information offsetting unit is further configured to increase an offset value by a first value multiplied by a selected step size when an ACK is included in the downlink transmission configuration message and decrease an offset value by a second value multiplied by the selected step size when the NACK is included in the downlink transmission confirmation message, where the first value is a target BLER, the second value is 1 minus the target BLER, and BLER denotes the block error rate.

9. The wireless base station apparatus of claim 8, wherein the radio quality information offsetting unit is further configured to select the selected step size based on which one of the ACK, the NACK, or a DTX is included in the downlink transmission confirmation message transmitted from the wireless communications terminal.

10. The wireless base station apparatus of claim 8, wherein the radio quality information offsetting unit is further configured to select the selected step size based on a priority class.

11. The wireless base station apparatus of claim 8, wherein the radio quality information offsetting unit is further configured to select the selected step size based on a service type.

12. The wireless base station apparatus of claim 8, wherein the radio quality information offsetting unit is further configured to select the selected step size based on a current communication cell.

13. The wireless base station apparatus of claim 8, wherein the radio quality information offsetting unit is further configured to select the selected step size based on a contract type.

14. A wireless communication method between a wireless base station apparatus and a wireless communications terminal device, comprising:

receiving, by a receiver, downlink radio quality information from the wireless communication terminal device;

adjusting the downlink radio quality information to produce offset-adjusted radio quality information, such that a block error rate becomes a target level, based on a downlink transmission confirmation message transmitted from the wireless communications terminal and a required downlink quality;

determining, a downlink transport format based on the offset-adjusted radio quality information wherein the adjusting further includes producing the offset-adjusted radio quality information such that an offset value is increased when the downlink transmission confirmation message transmitted from the wireless communications terminal includes an ACK, producing the offset value such that the offset value is decreased when the downlink transmission confirmation message transmitted from the wireless communications terminal includes a NACK, and producing the offset value such that the offset value is unchanged when the downlink transmission confirmation message transmitted from the wireless communications terminal includes a DTX.

* * * * *